United States Patent
Nzudie et al.

(10) Patent No.: US 6,221,957 B1
(45) Date of Patent: Apr. 24, 2001

(54) AQUEOUS SALINE DISPERSIONS OF WATER-SOLUBLE POLYMERS CONTAINING AN AMPHIPHILIC DISPERSANT BASED ON A CATIONIC POLYMER CONTAINING HYDROPHOBIC UNITS

(75) Inventors: Denis Tembou Nzudie, Serquigny; Christian Collette, Paris, both of (FR)

(73) Assignee: Elf Atochem S.A., Puteaux (FR)

( * ) Notice: Subject to any disclaimer, the term of this patent is extended or adjusted under 35 U.S.C. 154(b) by 0 days.

(21) Appl. No.: 09/182,650

(22) Filed: Oct. 30, 1998

(30) Foreign Application Priority Data

Nov. 4, 1997 (FR) .................................................. 97 13860

(51) Int. Cl.[7] .......................... C08L 33/02; C08L 33/26; C08L 33/04
(52) U.S. Cl. ......................... 524/815; 524/555; 524/812
(58) Field of Search .................................... 524/815, 555, 524/812

(56) References Cited

U.S. PATENT DOCUMENTS

| 4,929,655 | 5/1990 | Takeda et al. . |
| 4,997,895 | * 3/1991 | Ohmar et al. .......................... 524/555 |
| 5,006,590 | 4/1991 | Takeda et al. . |
| 5,403,883 | * 4/1995 | Messner et al. ...................... 524/815 |
| 5,587,415 | 12/1996 | Takeda . |
| 5,597,858 | 1/1997 | Ramesh et al. . |
| 5,614,602 | 3/1997 | Connors et al. . |
| 5,708,071 | 1/1998 | Takeda . |

FOREIGN PATENT DOCUMENTS

| 170 394 | 2/1985 | (EP) . |
| 525 751 | 2/1993 | (EP) . |
| 364 175 | 12/1994 | (EP) . |
| 657 478 | 6/1995 | (EP) . |
| 717 056 | 6/1996 | (EP) . |
| 637 598 | 5/1997 | (EP) . |

OTHER PUBLICATIONS

Polysulfobetaines and Corresponding Cationic Polymers. IV. Synthesis and Aqueous Solution Properties of Cationic Poly (MIQSDMAPM), Wen–Fu Lee and Gow–Youg Hwong, Department of Chemical Engineering Tatung Institute of Technology, Taipei, Taiwan, 10451, Republic of China, Journal of Applied Polymer Science, vol. 59, 599–608 (1996), John Wiley & Sons, Inc.

* cited by examiner

*Primary Examiner*—Tae H. Yoon
(74) *Attorney, Agent, or Firm*—Smith, Gambrell & Russell, L.L.P.

(57) ABSTRACT

The invention relates to aqueous saline dispersions containing a water-soluble polymer and a dispersant based on a polymer, preferably a cationic polymer, containing hydrophobic units.

10 Claims, No Drawings

AQUEOUS SALINE DISPERSIONS OF WATER-SOLUBLE POLYMERS CONTAINING AN AMPHIPHILIC DISPERSANT BASED ON A CATIONIC POLYMER CONTAINING HYDROPHOBIC UNITS

FIELD OF THE INVENTION

The present invention relates to aqueous dispersions of water-soluble polymers containing a salt land an amphiphilic dispersant based on a cationic polymer containing hydrophobic units. The invention also relates to such dispersants and to a process for preparing them.

BACKGROUND OF THE INVENTION

Water-soluble polymers are used for various applications and, in particular, as flocculants for processing industrial and urban waste water, dehydration of the sludges generated, as a thickener and as a treating agent for floors. It is well known that aqueous systems of such water-soluble polymers with a high solids content are gelatinous and have very high viscosities, which make them difficult to handle and store. The problem with which a person skilled in the art is faced is to produce such aqueous systems but which have both a high solids content and low viscosity.

Conventional processes for synthesizing these polymers comprise solution, reverse-suspension and reverse-emulsion polymerization. Solution and reverse-suspension polymerization lead to products in powder form which have the drawback of generating dust at the time of use, of dissolving poorly in water and of not being able to form aqueous solutions of polymers in high concentration which can be handled easily. Besides this inconvenient implementation which is intrinsic to the pulverulent form of the product, these two processes are handicapped in terms of production efficiency, on the one hand on account of the low monomer concentration used during polymerization, and on the other hand on account of a drying and/or grinding step leading to an increase in the cycle time and excessive energy consumption costs. As regards the reverse-emulsion polymerization process, which has been known for about two decades, this leads to a product containing a pollutant organic solvent.

To overcome these drawbacks, a novel polymerization technique has been developed leading to aqueous dispersions of water-soluble polymers, the originality of which process lies in the presentation plan, i.e. they are free of pollutant solvent, do not generate any dust, are rapidly water-soluble, are of low viscosity at a high polymer content, and are ready to use. However, this technique requires the development of polymer dispersants which are suitable for the stability of the polymer dispersed in saline or non-saline medium.

Certain authors have prepared cationic or nonionic water-soluble polymers by polymerization of water-soluble monomers in the presence of a polymer dispersant of low mass. EP 170 394 describes a dispersion of polymer gel particles which are greater than 20 $\mu$m in size in a solution of poly(sodium acrylate) or poly(DADMAC)—denoting poly(diallyldimethylammonium chloride)—as dispersant. However, this product has the drawback of having a high viscosity after a long period of storage. This viscosity can only be reduced after shear or stirring.

Patents U.S. Pat. No. 183,466, EP 525,751 A1, U.S. Pat. Nos. 4,929,655, 5,006,590 and EP 657,478 A2 propose the case of precipitation-polymerization in saline medium of water-soluble monomers, the polymer of which precipitates in particle form and then disperses by means of stirring and is stabilized by polymer dispersants of low mass, which are themselves soluble in saline medium. The typical dispersants for these polymerizations are poly(DADMAC) or copoly(DADMAC)/(M)ADAMQUAT C16, the latter monomer denoting (meth)acryloxyethyldimethylhexadecylammonium chloride (EP 657,478 A2). In the context of polymerizations in saline medium, patent EP 0,717,056 A2 claims amphoteric water-soluble polymer dispersions based on cationic and anionic monomers (acrylic acid), synthesized in the presence of a dispersant which is a homopolymer of cationic monomers or which is a copolymer of the same cationic monomers with acrylamide.

The typical monomer mixture for this type of polymerization consists of (meth)acrylamide, (meth)acryloxyethyltrimethylammonium chloride and (meth)acryloxyethyldimethylbenzylammonium chloride. The latter monomer plays an important role in the precipitation of the cationic polymer formed during the synthesis and in the formation of particles. U.S. Pat. No. 5,587,415 shows that it is possible to dispense with this monomer by replacing it with another equivalent in which the benzyl group is replaced with a sufficiently hydrophobic $C_4$–$C_{10}$ alkyl chain. Similarly, U.S. Pat. No. 5,614,602 shows that the same result can be achieved by partially replacing the (meth)acrylamide with an N-alkylacrylamide and/or with an N,N-dialkylacrylamide. The Applicant has now found that stable aqueous dispersions of low viscosity containing a salt, a water-soluble polymer and a dispersant based on cationic polymer containing hydrophobic units can be prepared.

DESCRIPTION OF THE INVENTION

According to the invention, the term salt is understood to refer to the inorganic salts whose aqueous solution dissolves the dispersant polymer without dissolving the dispersed polymer, the latter being precipitated as soon as it forms. The representative salts are ammonium sulphate, sodium sulphate, aluminium sulphate, sodium chloride and sodium dihydrogen phosphate.

The dispersions according to the invention contain:
from 21 to 24% by weight, and preferably from 21.5 to 23%, of salt,
from 0.5 to 25% by weight, and preferably from 1 to 10%, of dispersant polymer, and
from 10 to 40% by weight, and preferably from 15 to 30%, of dispersed polymer.

The salt is added in 2 portions. During the polymerization, 16 to 19%, and preferably from 16.5 to 18%, by weight is added, and after this addition a further 5% is added.

The dispersants constituting one of the subjects of the invention can be cationic, amphoteric or nonionic polymers containing hydrophobic units.

Applicant has also discovered that, in order to reinforce the stability over time of the emulsion, the solution containing the dispersant must have a sufficient viscosity in order to avoid sedimentation of the particles. One of the means for increasing the viscosity of the dispersant solution is to use a dispersant of associative nature, i.e. a copolymer containing at least one hydrophobic sequence and at least one hydrophilic sequence and capable of organizing itself by creating hydrophilic and/or hydrophobic microzones. The highly hydrophobic units, in particular styrene or acrylic units with a long alkyl chain, impart this associative nature and thus increase the viscosity, as well as having a secondary function such as the removal of the pollutant organic microorganisms present in the spent waters.

The dispersants of the invention are polymers comprising:
a) from 15 to 99 mol %, and preferably from 20 to 60 mol %, of at least one water-soluble monomer residue chosen from group A consisting of:
a monomer $A_1$ corresponding to the following general formulae.

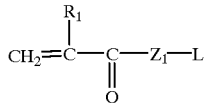

in which
$R_1$=H or $CH_3$,
$Z_1$=O, NH or $NR_2$ with $R_2$ being a $C_1$–$C_6$ alkyl or hydroxyalkyl group

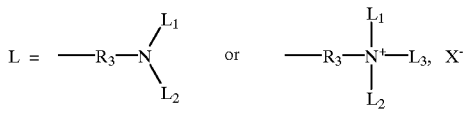

where $R_3$=$C_1$–$C_6$ alkyl or hydroxyalkyl and $L_1$, $L_2$ and $L_3$ independently represent an H or a $C_1$–$C_6$ alkyl or hydroxyalkyl, a $C_5$–$C_{18}$ cycloalkyl or a $C_6$–$C_{18}$ aryl or alkylaryl,
X is a monovalent ion such as Cl, SNC, etc.
The monomers $A_2$ corresponding to the formula:

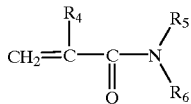

in which
$R_4$=H or a methyl,
$R_5$ and $R_6$ independently represent an H or a $C_1$–$C_6$ alkyl or hydroxyalkyl or a $C_5$–$C_{12}$ cycloalkyl,
the monomers $A_3$ containing a carboxylic acid function and their derivatives such as acrylic, methacrylic or itaconic acid and their salts,
the monomers $A_4$ containing quaternary ammonium functions such as diallyldimethylammonium chloride, denoted by DADMAC, or imidized and salified maleic anhydride,
any other water-soluble monomer different from those mentioned above, which can be emulsion-polymerized via a radical route,
b) from 1 to 85%, and preferably from 40 to 80%, of residues of at least one monomer B chosen from the group consisting of:
the monomers $B_1$ corresponding to the following formula:

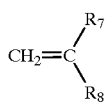

in which
$R_7$ represents an H or a $C_1$–$C_{12}$ alkyl or a $C_5$–$C_{12}$ cycloalkyl or a $C_6$–$C_{12}$ aryl or a $C_8$–$C_{32}$ arylalkyl group,
$R_8$ represents an H or a $C_1$–$C_{12}$ alkyl or a $C_5$–$C_{12}$ cycloalkyl or a $C_6$–$C_{12}$ aryl or a $C_8$–$C_{32}$ arylalkyl group, it being possible for $R_7$ and $R_8$ to be identical or different,
the molecules $B_2$ corresponding to the following general formula:

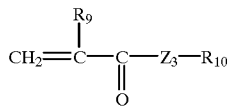

in which
$R_9$=H or $CH_3$,
$Z_3$ represents an O, $NH_3$ or $NR_{11}$ with $R_{11}$=$C_1$–$C_4$ alkyl,
$R_{10}$ represents a $C_1$–$C_{32}$ alkyl, $C_5$–$C_{12}$ cycloalkyl, $C_6$–$C_{12}$ aryl or $C_8$–$C_{32}$ arylalkyl group,
any other monomer $B_3$ containing a polymerizable double bond. Examples of this are maleic anhydride, vinylidene chloride, vinylidene fluoride, vinyl chloride, butadiene, chloroprene, etc.,
c) from 0 to 30% of at least one amphiphilic monomer which can be chosen from group C consisting of:
the molecules $C_1$ corresponding to one of the following general formulae:

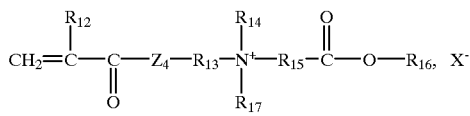

in which
$Z_4$=O, NH or $NR_{21}$, $R_{21}$ being a $C_1$–$C_6$ alkyl or $C_5$–$C_{12}$ cycloalkyl group,
$R_{12}$=H or a methyl,
$R_{13}$, $R_{14}$, $R_{15}$ and $R_{17}$ independently represent a $C_1$–$C_6$ alkyl or hydroxyalkyl or a $C_5$–$C_{12}$ cycloalkyl,
$R_{16}$ represents a $C_1$–$C_{32}$ alkyl or a $C_8$–$C_{32}$ aryl and/or arylalkyl,
X is a halogen, pseudohalogen, $SO_4CH_3$, acetate, SNC, etc.,

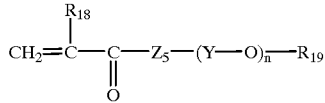

in which
$R_{18}$=H or methyl,
$Z_5$=O, NH or NR20 with $R_{20}$=$C_1$–$C_6$ alkyl or hydroxyalkyl,
Y=$C_1$–$C_6$ alkyl,
n is an integer between 1 and 50,
$R_{19}$=$C_1$–$C_{32}$ alkyl, $C_6$–$C_{32}$ aryl or $C_6$–$C_{32}$ arylalkyl,
the molecules $A_1$.
The preferred dispersants of the invention are:
polymers based on styrene and on acryloxyethyltrimethylammonium-chloride, denoted as ADAMQUAT MC,
polymers based on styrene, acryloxyethyltrimethylammonium chloride, denoted as ADAMQUAT MC, and (meth)acrylates containing a long alkyl chain, such as behenyl acrylate ($A_{18-22}$), polymers based on imidized, and then salified or quaternized maleic anhydride, and containing:
15 to 90 mol %, and preferably 26 to 60 mol %, of maleic anhydride,
at least one hydrophobic monomer B1, B2 or any other monomer containing a polymerizable double bond.

These maleic anhydride copolymers must next be imidized and then salified or quaternized in order to give them the cationic nature. Typical examples of these dispersants are styrene/maleic anhydride copolymers imidized with diamines and then salified with an acid or quaternized with an alkyl or cycloalkyl or aryl or arylalkyl halide. The dispersants containing styrene as hydrophobic unit can be represented by the following general formula:

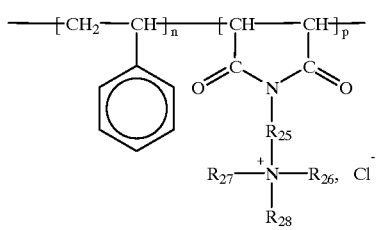

in which
$R_{25}$ represents a $C_1$–$C_{32}$ alkyl or hydroxyalkyl, a $C_6$–$C_{32}$ aryl or a $C_6$–$C_{32}$ arylalkyl group,
$R_{26}$, $R_{27}$ and $R_{28}$=H or a $C_1$–$C_{32}$ alkyl or hydroxyalkyl, $C_6$–$C_{32}$ aryl or $C_6$–$C_{32}$ aralkyl group,
$R_{26}$, $R_{27}$ and $R_{28}$ may be identical or different.

The dispersant polymers according to the invention, obtained from hydrophobic, water-soluble (cationic, anionic, nonionic) and optionally amphiphilic monomers are prepared according to a batchwise or semi-continuous process by radical solution copolymerization in a solvent or a mixture of solvents with a low boiling point. The polymerization step is followed by distillation of the low-boiling solvent and addition of water in order to obtain a presentation of dispersant as an aqueous solution free of pollutant solvent. These solvents are generally ketones, alcohols and ether. Typical examples of solvents are acetone, methyl ethyl ketone and ethanol. The total monomer concentration can range from 5 to 75% by weight and preferably 20 to 50%. The polymerization is carried out in the presence of initiator[]s used in a proportion of from 0.1 to 4%, and preferably 0.5 to 2%, relative to the total weight. Peroxides such as benzoyl peroxide, lauroyl peroxide, succinyl peroxide and tert-butyl perpivalate, or diazo compounds such as 2,2'-azobisisobutyronitrile, 2,2'-azobis(2,4-dimethylvaleronitrile) and azodicarbonamide can be used as initiators. The process can also be performed in the presence of UV radiation and photoinitiators such as benzophenone, 2-methylanthraquinone or 2-chlorothioxanthone. The polymer chain lengths can, if so desired, be adjusted using chain transfer agents such as alkyl mercaptans, carbon tetrachloride or triphenylmethane, used in a proportion of from 0.05 to 3% relative to the total weight of the monomers. The reaction temperature can vary within a wide range, i.e. from −40° C. to 200° C. Preferably, the process is performed between 50 and 95° C.

The dispersants based on maleic anhydride copolymers are obtained by imidization of the polymers obtained from hydrophobic monomer and from maleic anhydride with a diamine (for example dimethylaminopropylamine) according to the technique described in the literature. This polymer is then salified with an acid or quaternized with an alkyl halide such as methyl or benzyl chloride (J. Applied Polymer Science 59, 599–608, 1996).

The water-soluble polymers according to the invention contain:
from 0 to 90 mol % of residues of at least one monomer $A_2$,
from 5 to 50% of monomer residues corresponding to the following formula:

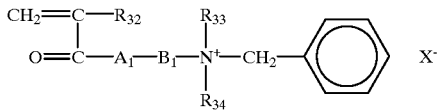

X=monovalent ion (Cl, SCN)
$R_{32}$=H or $CH_3$; $R_{33}$ and $R_{34}$ are $C_1$–$C_3$ alkyls, $A_1$ is either an oxygen or NH; $B_1$ is a $C_2$–$C_4$ alkyl or hydroxyalkyl,
from 0 to 20% of residues of at least one amphiphilic monomer C,
from 0 to 20% of residues of at least one monomer $A_3$.

The water-soluble polymer can be synthesized by polymerization techniques known to those skilled in the art. The water-soluble polymer dispersion according to the invention is prepared in the presence of 0.5 to 25%, and preferably 1 to 10%, of copolymer dispersant obtained according to the methods described above, by radical polymerization in saline aqueous medium of the monomer mixture described above. The monomer mixture represents from 10 to 40%, and preferably 15 to 30%, of the reaction mixture consisting of water, the dispersant copolymer, the salt and monomers. The polymerization can be initiated by various means, for instance free-radical generators such as peroxides, diazo compounds or persulphates, or by irradiation. The preferred method according to the invention is initiation with 2,2'-azobis(2-aminopropane) hydrochloride, denoted hereinbelow as ABAH. These initiators can be combined with a decomposition accelerator. The polymerization temperature is between 0 and 100° C. and preferably 40 and 95° C. The conversion is greater than 99%.

The dispersants or dispersions of water-soluble polymer obtained can be used for the following applications: flocculant, paper retention, agent for facilitating cleaning on various supports (for example textile), dispersion of charges, inhibitor for the transfer of pigments and dyes onto various supports (for example textile) and thickeners.

EXAMPLES

Example 1

In all the examples below, the parts are given on a weight basis.
a) Preparation of the Dispersant Copolymer
320 parts of ethanol, 150 parts of methyl ethyl ketone, 98 parts of styrene, 228 parts of aqueous 80% acryloxyethyltrimethylammonium chloride (QUAT MC) solution and 2 parts of n-dodecyl mercaptan are introduced with stirring into a 1-litre reactor. The reactor is brought to 75° C. while flushing with nitrogen and 0.36 part of 2,2'-azobis (isobutyronitrile) (AIBN) and 0.72 part of 2,2'-azobis(2,4-dimethylvaleronitrile) (V65) are then introduced. After reaction for 2 h 30, the distillation is started by gradually raising the jacket temperature from 78° C. to 99° C. After about 350 parts of solvent have been removed, 480 parts of water are added and the distillation is continued until all of the ethanol/methyl ethyl ketone mixture has been removed.

b) Preparation of the Water-soluble Polymer Dispersion Based on Styrene/QUAT MC Copolymer Dispersant 152.3 parts of water, 63.5 parts of aqueous 38.9% solution of dispersant copolymer (50/50 mol % styrene/QUAT MC) prepared above, 63.4 parts of aqueous 80% acryloxyethyldimethylbenylammonium chloride (QUAT BZ) solution, 69.4 parts of 50% acrylamide in water, 18.2 parts of aqueous 80% acryloxyethyltrimethylammonium chloride (QUAT MC) solution, 80 parts of ammonium sulphate and 4.5 g of glycerol are introduced into a 1-litre reactor. The reactor is brought to 60° C. over 30 minutes while flushing with nitrogen and 0.02 part of 2,2'-azobis(2-aminopropane) hydrochloride (ABAH) diluted in 5 parts of water is introduced. The temperature is maintained at 60° C. for 1 h 30. A further 0.05 part of ABAH diluted in 5 parts of water is then added and the reaction is left to continue for a further 4 h. A post-addition of 30 parts of ammonium sulphate, 0.5 part of ammonium thiocyanate and 5 parts of acetic acid is then carried out. After stirring for 30 minutes, the reactor is cooled to 30° C. and emptied.

A stable 65/25/10 molar dispersion of acrylamide/QUATBZ/QUATMC copolymer, stabilized with the 50/50 molar styrene/QUATMC copolymer dispersant, with a Brookfield viscosity of 60 cp at 25° C., is obtained.

Examples 2, 3, 4, 5, 6, 7 and 8

These are identical to Example 1 except that the dispersant copolymer synthesized according to the above operating procedure is different and contains a third comonomer which is behenyl acrylate ($A_{18-22}$).

The compositions of the monomer mixture used for the synthesis of the water-soluble copolymer dispersion, as well as those for the dispersant copolymers, are listed below. The dispersed copolymer of Example 6 contains a fourth polyethoxylated methacrylate comonomer with a triphenylstyryl group (SIPOMER SEM) which gives the dispersed copolymer a hydrophobic secondary function which can capture the organic micropollutants in the spent waters. Moreover, the presence of methacrylic acid in Examples 6 and 7 gives the dispersed copolymer an amphoteric nature. The structure of the comonomer (SIPOMER SEM) is given below:

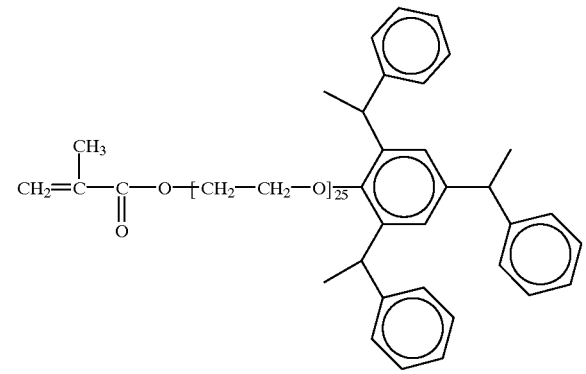

It has been noted that the incorporation of an acrylate containing a long alkyl chain, such as behenyl acrylate ($A_{18-22}$), improves the stability of the dispersions synthesized. This is because an aqueous 30% solution of 1/1 molar styrene/QUATMC polymer dispersant has a viscosity of 100 cp. The incorporation of a small proportion of $A_{18-22}$ unit (0.95/0.05/1 styrene/$A_{18-22}$/QUATMC dispersant copolymer) induces an associative nature in the dispersant and increases the viscosity from 100 cp to 12,500 cp. The resulting emulsion (Example 8) has a markedly improved stability over time when compared with Example 1 not containing $A_{18-22}$.

|  | Example | | |
|---|---|---|---|
|  | 2 | 3 | 4 |
| % of salts | | | |
| before post-addition | 17.2 | 17.2 | 17.2 |
| after post-addition | 22.2 | 22.2 | 22.2 |
| Dispersed phase (mol %) | QUAT BZ: 25%<br>QUAT MC: 10%<br>acrylamide: 65% | QUAT BZ: 25%<br>QUAT MC: 10%<br>acrylamide: 65% | QUAT BZ: 25%<br>QUAT MC: 10%<br>acrylamide: 65% |
| Dispersed polymer nature | purely water-soluble cationic | purely water-soluble cationic | purely water-soluble cationic |
| Dispersant (molar ratio) | styrene/$A_{18-22}$/QUATMC (0.7/0.05/1) | styrene/$A_{18-22}$/QUATMC (1.2/0.05/1) | styrene/$A_{18-22}$/QUATMC (1.2/0.05/1) |
| % dispersed/% dispersant (%/dispersion) | 20%/5% | 20%/5% | 20%/5% |
| Temperature | 60° C. | 60° C. | 60° C. |
| Initiator (ABAH) | To: 0.02 g<br>To + 1 h 30 ': 0.05 g | To: 0.02 g<br>To + 1 h 30 ': 0.05 g | To: 0.02 g<br>To + 1 h 30 ': 0.05 g |
| Polymerization time | 5 h 30 ' | 5 h 30 ' | 5 h 30 ' |
| Brookfield viscosity at 25° C. (cp) | 80 | 50 | 60 |

|  | Example | | | |
|---|---|---|---|---|
|  | 5 | 6 | 7 | 8 |
| % of salts | | | | |
| before post-addition | 17.2 | 17.2 | 17.2 | 17.2 |
| after post-addition | 22.2 | 22.2 | 22.2 | 22.2 |
| Dispersed phase | QUAT BZ: 25% | QUAT BZ: 25% | QUAT BZ: 25% | QUAT BZ: 25% |

-continued

| (mol %) | QUAT MC: 10%<br>acrylamide: 65% | QUAT MC: 10%<br>acrylamide: 65%<br>SIPOMER SEM: 1%<br>AMA: 5.7% | QUAT MC: 10%<br>acrylamide: 65%<br>AMA: 7% | QUAT MC: 10%<br>acrylamide: 65% |
|---|---|---|---|---|
| Dispersed polymer nature | purely<br>water-soluble<br>cationic | water-soluble<br>amphoteric<br>hydrophobic<br>modified | water-soluble<br>amphoteric | purely<br>water-soluble<br>cationic |
| Dispersant<br>(molar ratio) | styrene/<br>$A_{18-22}$/QUATMC<br>(1.45/0.05/1) | styrene/<br>$A_{18-22}$/QUATMC<br>(1.2/0.05/1) | styrene/<br>$A_{18-22}$/QUATMC<br>(1.2/0.05/1) | styrene/<br>$A_{18-22}$/QUATMC<br>(0.95/0.05/1) |
| % dispersed/% dispersant (%/dispersion) | 20%/5% | 20%/5% | 20%/5% | 20%/5% |
| Temperature | 60° C. | 60° C. | 60° C. | 60° C. |
| Initiator (ABAH) | To: 0.02 g<br>To + 1 h 30 ': 0.05 g | To: 0.02 g<br>To + 1 h 30 ': 0.05 g | To: 0.02 g<br>To + 1 h 30 ': 0.05 g | To: 0.02 g<br>To + 1 h 30 ': 0.05 g |
| Polymerization time | 5 h 30 ' | 5 h 30 ' | 5 h 30 ' | 5 h 30 ' |
| Brookfield viscosity at 25° C. (cp) | 70 | 80 | 80 | 700 |

To: time of introduction of the first dose of initiator.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

What is claimed is:

1. Aqueous saline dispersion comprising:

from 21 to 24% by weight of salt, from 0.5 to 25% by weight of dispersant polymer, and from 10 to 40% by weight of dispersed polymer, the dispersant polymer containing:

a—from 15 to 99 mol % of at least one unit derived by polymerization of a water-soluble monomer selected from group A consisting of:

the monomers $A_1$ corresponding to the formula:

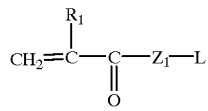

in which
$R_1$=H or $CH_3$,
$Z_1$=O, NH or $NR_2$ with $R_2$ being a $C_1$–$C_6$ alkyl or hydroxyalkyl group

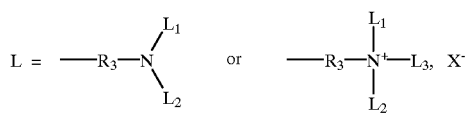

where $R_3$=$C_1$–$C_6$ alkyl or hydroxyalkyl and $L_1$, $L_2$ and $L_3$ independently represent an H or a $C_1$–$C_6$ alkyl or hydroxyalkyl, a $C_5$–$C_{18}$ cycloalkyl or a $C_6$–$C_{18}$ aryl or alkylaryl, X is a monovalent ion, the monomers $A_2$ corresponding to the formula

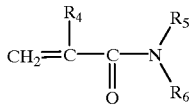

in which
$R_4$=H or $CH_3$,
$R_5$ and $R_6$ independently represent an H, a $C_1$–$C_6$ alkyl or hydroxyalkyl or a $C_5$–$C_{12}$ cycloalkyl,
and the monomers $A_3$ containing a carboxylic acid function, b—from 1 to 85 mol %, of at least one unit derived by polymerization of a hydrophobic monomer B, c—from 0 to 30 mol % of at least one unit derived by polymerization of an amphiphilic monomer C.

2. Aqueous dispersion according to claim 1, wherein the dispersant polymer contains from 20 to 60 mol % of at least one unit derived by polymerization of a water-soluble monomer A, and from 40 to 80 mol % of at least one unit derived by polymerization of a hydrophobic monomer B.

3. Aqueous dispersion according to claim 1, wherein the monomer A is acryloxyethyltrimethylammonium chloride or imidized, salified or quaternized maleic anhydride.

4. Aqueous dispersion according to claim 1, wherein the monomer B is selected from the group consisting of the monomers $B_1$ corresponding to the formula:

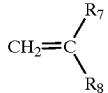

in which
$R_7$ represents an H or a $C_1$–$C_{12}$ alkyl or a $C_5$–$C_{12}$ cycloalkyl or a $C_6$–$C_{12}$ aryl or a $C_8$–$C_{32}$ arylalkyl group,
$R_8$ represents an H or a $C_1$–$C_{12}$ alkyl or a $C_5$–$C_{12}$ cycloalkyl or a $C_6$–$C_{12}$ aryl or a $C_8$–$C_{32}$ arylalkyl group,
$R_7$ and $R_8$ are identical or different, the molecules $B_2$ correponding to the formula:

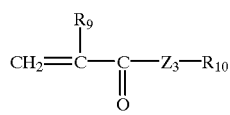

in which $R_9$=H or $CH_3$, $Z_3$ represents an O, $NH_3$ or $NR_{11}$ with $R_{11}$=$C_1$–$C_4$ alkyl, $R_{10}$ represent a $C_1$–$C_{32}$ alkyl, $C_5$–$C_{12}$ cycloalkyl, $C_6$–$C_{12}$ aryl or $C_8$–$C_{32}$ arylalkyl group, and any other monomer $B_3$ containing a polymerizable double bond.

5. Aqueous dispersion according to claim 1, wherein the monomer B is styrene or behenyl acrylate.

6. Aqueous dispersion according to claim 1, wherein the dispersed polymer contains from 5 to 50 mol % of residues of at least one monomer $A_1$, from 5 to 50% of monomer residues corresponding to the formula:

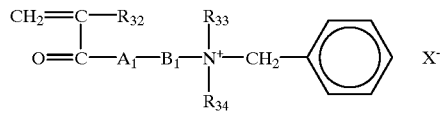

X=monovalent ion, $R_{32}$=H or $CH_3$; $R_{33}$ and $R_{34}$ are $C_{1-3}$ alkyls, $A_1$ is either oxygen or NH; $B_1$ is either a $C_{2-4}$ alkyl or hydroxyalkyl, from 0 to 90 mol % of residues of at least one monomer $A_2$, from 0 to 20 mol % of residues of at least one monomer $A_3$, from 0 to 20 mol % of residues of at least one monomer C.

7. Aqueous dispersion according to claim 1, wherein the carboxylic acid function is acrylic, methacrylic or itaconic acid and their salts.

8. Aqueous dispersion according to claim 4, wherein the polymerizable double bond is maleic anhydride, vinylidene chloride, vinylidene fluoride, vinyl chloride, butadiene or chloroprene.

9. Aqueous dispersion according to claim 1, wherein the monovalent ion X is either Cl or SNC.

10. Aqueous dispersion according to claim 6, wherein the monovalent ion X is either Cl or SNC.

* * * * *